US012581113B2

(12) United States Patent
Chen et al.

(10) Patent No.: US 12,581,113 B2
(45) Date of Patent: Mar. 17, 2026

(54) TEMPLATE-MATCHING BASED ADAPTIVE BLOCK VECTOR RESOLUTION (ABVR) IN IBC

(71) Applicant: Tencent America LLC, Palo Alto, CA (US)

(72) Inventors: Lien-Fei Chen, Hsinchu (TW);
Xiaozhong Xu, State College, PA (US);
Roman Chernyak, Palo Alto, CA (US);
Xin Zhao, Santa Clara, CA (US); Shan Liu, San Jose, CA (US)

(73) Assignee: TENCENT AMERICA LLC, Palo Alto, CA (US)

( * ) Notice: Subject to any disclaimer, the term of this patent is extended or adjusted under 35 U.S.C. 154(b) by 383 days.

(21) Appl. No.: 18/241,071

(22) Filed: Aug. 31, 2023

(65) Prior Publication Data

US 2024/0236367 A1     Jul. 11, 2024

Related U.S. Application Data

(60) Provisional application No. 63/438,491, filed on Jan. 11, 2023.

(51) Int. Cl.
| | |
|---|---|
| *H04N 19/593* | (2014.01) |
| *H04N 19/105* | (2014.01) |
| *H04N 19/132* | (2014.01) |

(Continued)

(52) U.S. Cl.
CPC ......... *H04N 19/593* (2014.11); *H04N 19/105* (2014.11); *H04N 19/132* (2014.11);

(Continued)

(58) Field of Classification Search
CPC .. H04N 19/105; H04N 19/136; H04N 19/159; H04N 19/167; H04N 19/52;

(Continued)

(56) References Cited

U.S. PATENT DOCUMENTS

| | | | |
|---|---|---|---|
| 2024/0015333 A1* | 1/2024 | Chen | H04N 19/593 |
| 2024/0223748 A1* | 7/2024 | Lin | H04N 19/70 |

(Continued)

FOREIGN PATENT DOCUMENTS

| | | | |
|---|---|---|---|
| WO | WO-2024145857 A1 * | 7/2024 | H04N 19/176 |

OTHER PUBLICATIONS

"Enhanced motion list reordering for video coding"—Wang et al., 978-1-6654-7592-1/22/$31.00 A © 2022 IEEE (Year: 2022).*

(Continued)

*Primary Examiner* — Mainul Hasan
(74) *Attorney, Agent, or Firm* — ARENTFOX SCHIFF LLP

(57) ABSTRACT

Coding information is received and indicates that an intra block copy (IBC) mode is applied to a current block. Based on the IBC mode being applied to the current block, first adaptive block vector resolution (ABVR) information included in the coding information is obtained from the received video bitstream. The first ABVR information is determined to indicate that a plurality of BV precisions is associated with a block vector (BV) of the IBC mode. The plurality of BV precisions associated with the BV of the current block is reordered based on template matching (TM) differences between a template region of the current block and each of a plurality of template regions of reference blocks. A particular BV precision is selected from the plurality of reordered BV precisions by the TM differences. The current block is reconstructed based at least on the selected particular BV precision.

20 Claims, 7 Drawing Sheets

(51) Int. Cl.

| | |
|---|---|
| *H04N 19/136* | (2014.01) |
| *H04N 19/159* | (2014.01) |
| *H04N 19/167* | (2014.01) |
| *H04N 19/176* | (2014.01) |
| *H04N 19/88* | (2014.01) |

(52) U.S. Cl.
CPC ......... *H04N 19/136* (2014.11); *H04N 19/159* (2014.11); *H04N 19/167* (2014.11); *H04N 19/176* (2014.11); *H04N 19/88* (2014.11)

(58) Field of Classification Search
CPC .... H04N 19/523; H04N 19/593; H04N 19/70; H04N 19/88
See application file for complete search history.

(56) References Cited

U.S. PATENT DOCUMENTS

| | | | |
|---|---|---|---|
| 2024/0223756 A1* | 7/2024 | Zhang | .................. H04N 19/176 |
| 2024/0223797 A1* | 7/2024 | Chen | ................... H04N 19/176 |

OTHER PUBLICATIONS

"Motion Vector Coding and Block Merging in the Versatile Video Coding Standard"—Chien et al., IEEE Transactions on Circuits and Systems for Video Technology, vol. 31, No. 10, Oct. 2021 (Year: 2021).*
"Improvements on Intra Block Copy in Natural Content Video Coding"—Chen et al., 978-1-4799-8391-9/15/$31.00 A © 2015 IEEE (Year: 2015).*

* cited by examiner

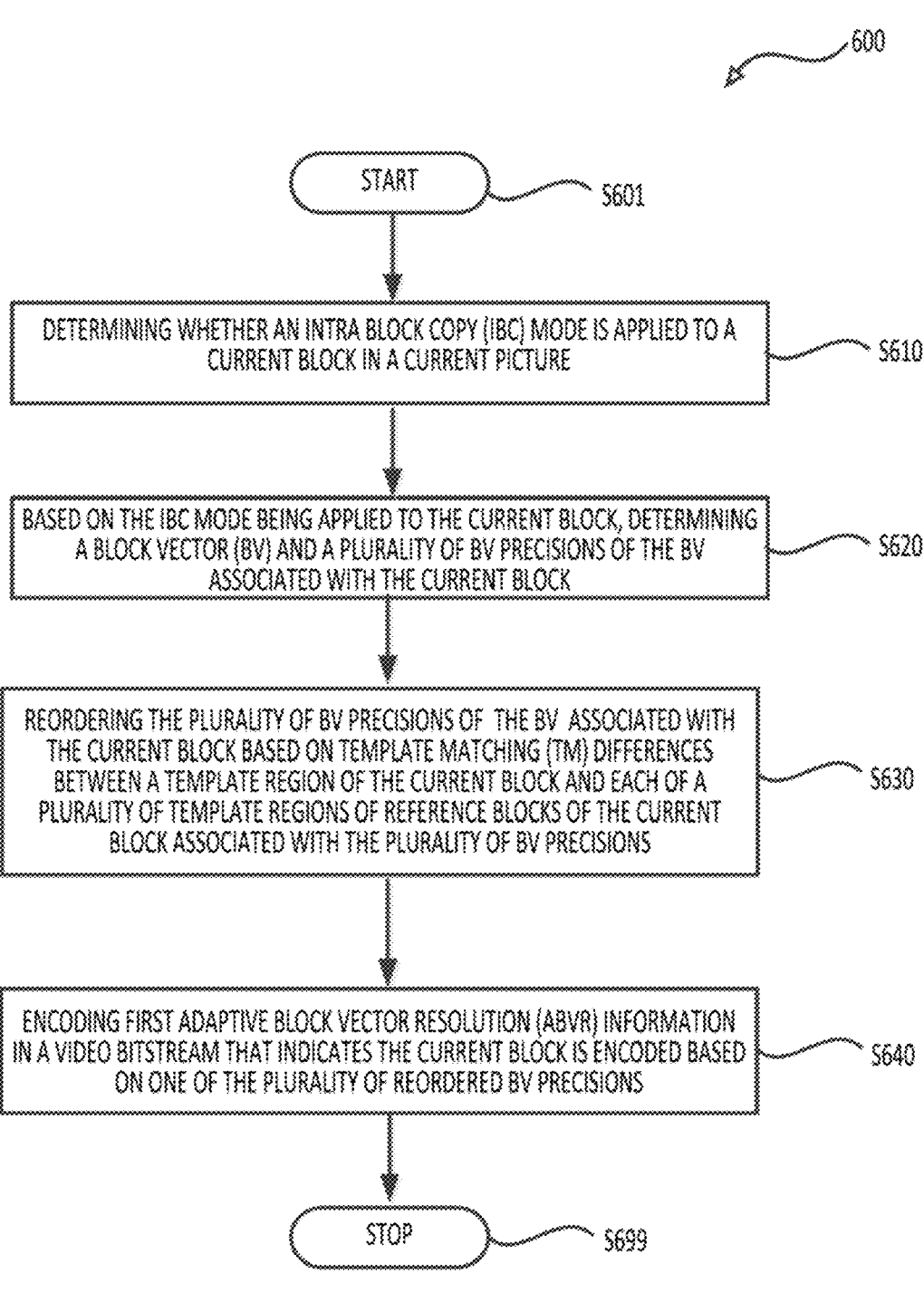

600

START —— S601

DETERMINING WHETHER AN INTRA BLOCK COPY (IBC) MODE IS APPLIED TO A CURRENT BLOCK IN A CURRENT PICTURE —— S610

BASED ON THE IBC MODE BEING APPLIED TO THE CURRENT BLOCK, DETERMINING A BLOCK VECTOR (BV) AND A PLURALITY OF BV PRECISIONS OF THE BV ASSOCIATED WITH THE CURRENT BLOCK —— S620

REORDERING THE PLURALITY OF BV PRECISIONS OF THE BV ASSOCIATED WITH THE CURRENT BLOCK BASED ON TEMPLATE MATCHING (TM) DIFFERENCES BETWEEN A TEMPLATE REGION OF THE CURRENT BLOCK AND EACH OF A PLURALITY OF TEMPLATE REGIONS OF REFERENCE BLOCKS OF THE CURRENT BLOCK ASSOCIATED WITH THE PLURALITY OF BV PRECISIONS —— S630

ENCODING FIRST ADAPTIVE BLOCK VECTOR RESOLUTION (ABVR) INFORMATION IN A VIDEO BITSTREAM THAT INDICATES THE CURRENT BLOCK IS ENCODED BASED ON ONE OF THE PLURALITY OF REORDERED BV PRECISIONS —— S640

STOP —— S699

*FIG. 6*

TEMPLATE-MATCHING BASED ADAPTIVE BLOCK VECTOR RESOLUTION (ABVR) IN IBC

INCORPORATION BY REFERENCE

The present application claims the benefit of priority to U.S. Provisional Application No. 63/438,491, "TEMPLATE-MATCHING BASED ADAPTIVE MOTION VECTOR RESOLUTION (AMVR) IN IBC" filed on Jan. 11, 2023, which is incorporated by reference herein in its entirety.

TECHNICAL FIELD

The present disclosure describes embodiments generally related to video coding.

BACKGROUND

The background description provided herein is for the purpose of generally presenting the context of the disclosure. Work of the presently named inventors, to the extent the work is described in this background section, as well as aspects of the description that may not otherwise qualify as prior art at the time of filing, are neither expressly nor impliedly admitted as prior art against the present disclosure.

Image/video compression can help transmit image/video data across different devices, storage and networks with minimal quality degradation. In some examples, video codec technology can compress video based on spatial and temporal redundancy. In an example, a video codec can use techniques referred to as intra prediction that can compress an image based on spatial redundancy. For example, the intra prediction can use reference data from the current picture under reconstruction for sample prediction. In another example, a video codec can use techniques referred to as inter prediction that can compress an image based on temporal redundancy. For example, the inter prediction can predict samples in a current picture from a previously reconstructed picture with motion compensation. The motion compensation can be generally indicated by a motion vector (MV).

SUMMARY

Aspects of the disclosure includes methods and apparatuses for video encoding/decoding. In some examples, an apparatus for video decoding includes processing circuitry.

According to an aspect of the disclosure, a method of video decoding performed in a video decoder is provided. In the method, a video bitstream including coding information of a current block is received. The coding information indicates that an intra block copy (IBC) mode is applied to the current block. Based on the IBC mode being applied to the current block, first adaptive block vector resolution (ABVR) information included in the coding information is obtained from the received video bitstream. The first ABVR information is determined to indicate that a plurality of BV precisions is associated with a block vector (BV) of the IBC mode. The plurality of BV precisions associated with the BV of the current block is reordered based on template matching (TM) differences between a template region of the current block and each of a plurality of template regions of reference blocks. A particular BV precision is selected from the plurality of reordered BV precisions by the TM differences.

The current block is reconstructed based at least on the selected particular BV precision.

In an example, the TM differences between the template region of the current block and each of the template regions of the reference blocks of the current block associated with the plurality of BV precisions are determined. The template region of the current block includes samples over a top side and on a left side of the current block. The plurality of BV precisions is reordered based on the TM differences between the template region of the current block and the template regions of the reference blocks of the current block in an ascending order.

In an example, the first ABVR information includes first precision index information that indicates the particular BV precision corresponding to a minimum TM difference among the TM differences between the template region of the current block and the template regions of the reference blocks of the current block. The particular BV precision is further selected from the plurality of reordered BV precisions that corresponds to the minimum TM difference according to the first precision index information.

In an example, based on the IBC mode being applied to the current block and the first ABVR information indicating that the particular BV precision corresponds to a minimum TM difference among the TM differences, the particular BV precision is selected from the plurality of reordered BV precisions corresponding to the minimum TM difference among the TM differences between the template region of the current block and the template regions of the reference blocks of the current block.

In an example, based on the IBC mode being applied to the current block and the first ABVR information indicating that the particular precision does not correspond to the minimum TM difference, the particular BV precision is selected from the plurality of reordered BV precisions based on first precision index information included in the coding information. The first precision index information indicates that the particular BV precision corresponds to a second minimum difference among the TM differences between the template region of the current block and the template regions of the reference blocks of the current block.

In an example, based on the first ABVR information indicating that a predetermined BV precision is excluded from the plurality of BV precisions, a subset of the plurality of BV precisions that excludes the predetermined BV precision is reordered based on TM differences between the template region of the current block and template regions of a subset of the reference blocks of the current block that excludes a predetermined reference block corresponding to the predetermined BV precision in an ascending order.

In an example, the particular BV precision is selected from the plurality of reordered BV precisions based on first precision index information included in the coding information that indicates the particular BV precision corresponding to a minimum TM difference among the TM differences between the template region of the current block and the template regions of the subset of the reference blocks of the current block.

In an example, based on the first ABVR information indicating that the one of the plurality of BV precisions does not correspond to a minimum TM difference among the TM differences, whether second ABVR information of the coding information indicates that the plurality of BV precisions is ordered based on a pre-defined sequence is determined. Based on the second ABVR information indicating that the plurality of BV precisions is ordered according to the pre-defined sequence, the particular BV precision is selected from the plurality of BV precisions in the pre-defined sequence based on second precision index information that is included in the coding information and indicates which one of the plurality of BV precisions is selected.

In an example, based on the first ABVR information indicating that ABVR is enabled such that the plurality of BV precisions is ordered according to a pre-defined sequence, whether second ABVR information of the coding information indicates that the plurality of BV precisions is reordered based on the TM differences is determined. Based on the second ABVR information indicating that the plurality of BV precisions is reordered based on the TM differences, the particular BV precision is selected from the plurality of reordered BV precisions that corresponds to a minimum difference among the TM differences between the template region of the current block and the template regions of the reference blocks of the current block.

In an example, based on the first ABVR information indicating that the ABVR is enabled, whether the second ABVR information of the coding information indicates that the plurality of BV precisions is reordered based on the TM differences is determined. Based on the second ABVR information being determined as indicating that the plurality of BV precisions is not reordered based on the TM differences, the particular BV precision is selected from the plurality of BV precisions in a pre-defined sequence based on second precision index information that indicates which one of the plurality of BV precisions is selected.

According to another aspect of the disclosure, an apparatus is provided. The apparatus includes processing circuitry. The processing circuitry can be configured to perform any of the described methods for video decoding/encoding.

Aspects of the disclosure also provide a non-transitory computer-readable medium storing instructions which, when executed by a computer, cause the computer to perform the method for video decoding/encoding.

BRIEF DESCRIPTION OF THE DRAWINGS

Further features, the nature, and various advantages of the disclosed subject matter will be more apparent from the following detailed description and the accompanying drawings in which:

FIG. 6 shows a flow chart outlining an encoding process according to some embodiments of the disclosure.

DETAILED DESCRIPTION OF EMBODIMENTS

Figure 1:
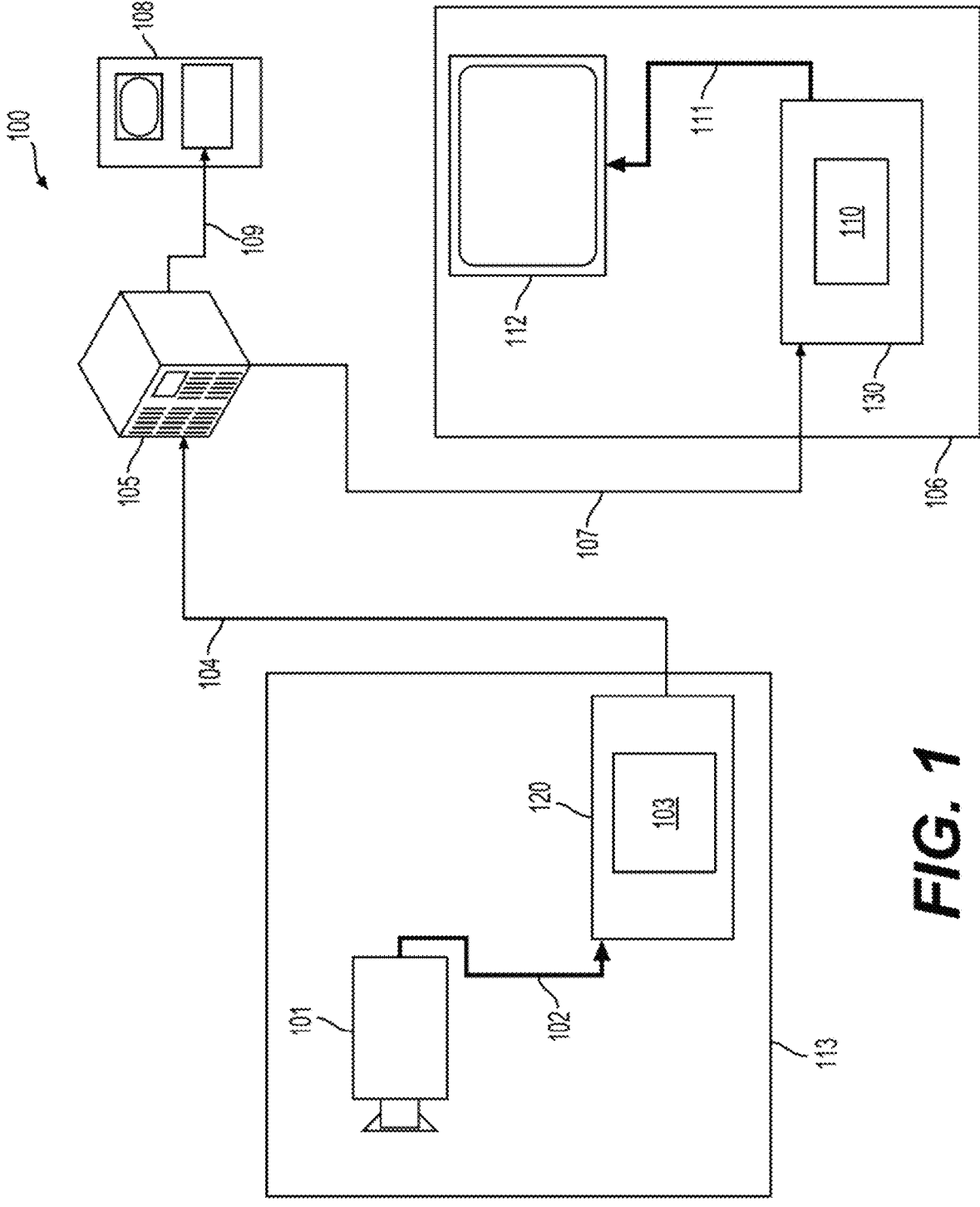
FIG. 1 is a schematic illustration of an exemplary block diagram of a communication system (100).

FIG. 1 shows a block diagram of a video processing system (100) in some examples. The video processing system (100) is an example of an application for the disclosed subject matter, a video encoder and a video decoder in a streaming environment. The disclosed subject matter can be equally applicable to other video enabled applications, including, for example, video conferencing, digital TV, streaming services, storing of compressed video on digital media including CD, DVD, memory stick and the like, and so on.

The video processing system (100) includes a capture subsystem (113), that can include a video source (101), for example a digital camera, creating for example a stream of video pictures (102) that are uncompressed. In an example, the stream of video pictures (102) includes samples that are taken by the digital camera. The stream of video pictures (102), depicted as a bold line to emphasize a high data volume when compared to encoded video data (104) (or coded video bitstreams), can be processed by an electronic device (120) that includes a video encoder (103) coupled to the video source (101). The video encoder (103) can include hardware, software, or a combination thereof to enable or implement aspects of the disclosed subject matter as described in more detail below. The encoded video data (104) (or encoded video bitstream), depicted as a thin line to emphasize the lower data volume when compared to the stream of video pictures (102), can be stored on a streaming server (105) for future use. One or more streaming client subsystems, such as client subsystems (106) and (108) in FIG. 1 can access the streaming server (105) to retrieve copies (107) and (109) of the encoded video data (104). A client subsystem (106) can include a video decoder (110), for example, in an electronic device (130). The video decoder (110) decodes the incoming copy (107) of the encoded video data and creates an outgoing stream of video pictures (111) that can be rendered on a display (112) (e.g., display screen) or other rendering device (not depicted). In some streaming systems, the encoded video data (104), (107), and (109) (e.g., video bitstreams) can be encoded according to certain video coding/compression standards. Examples of those standards include ITU-T Recommendation H.265. In an example, a video coding standard under development is informally known as Versatile Video Coding (VVC). The disclosed subject matter may be used in the context of VVC.

It is noted that the electronic devices (120) and (130) can include other components (not shown). For example, the electronic device (120) can include a video decoder (not shown) and the electronic device (130) can include a video encoder (not shown) as well.

Figure 2:
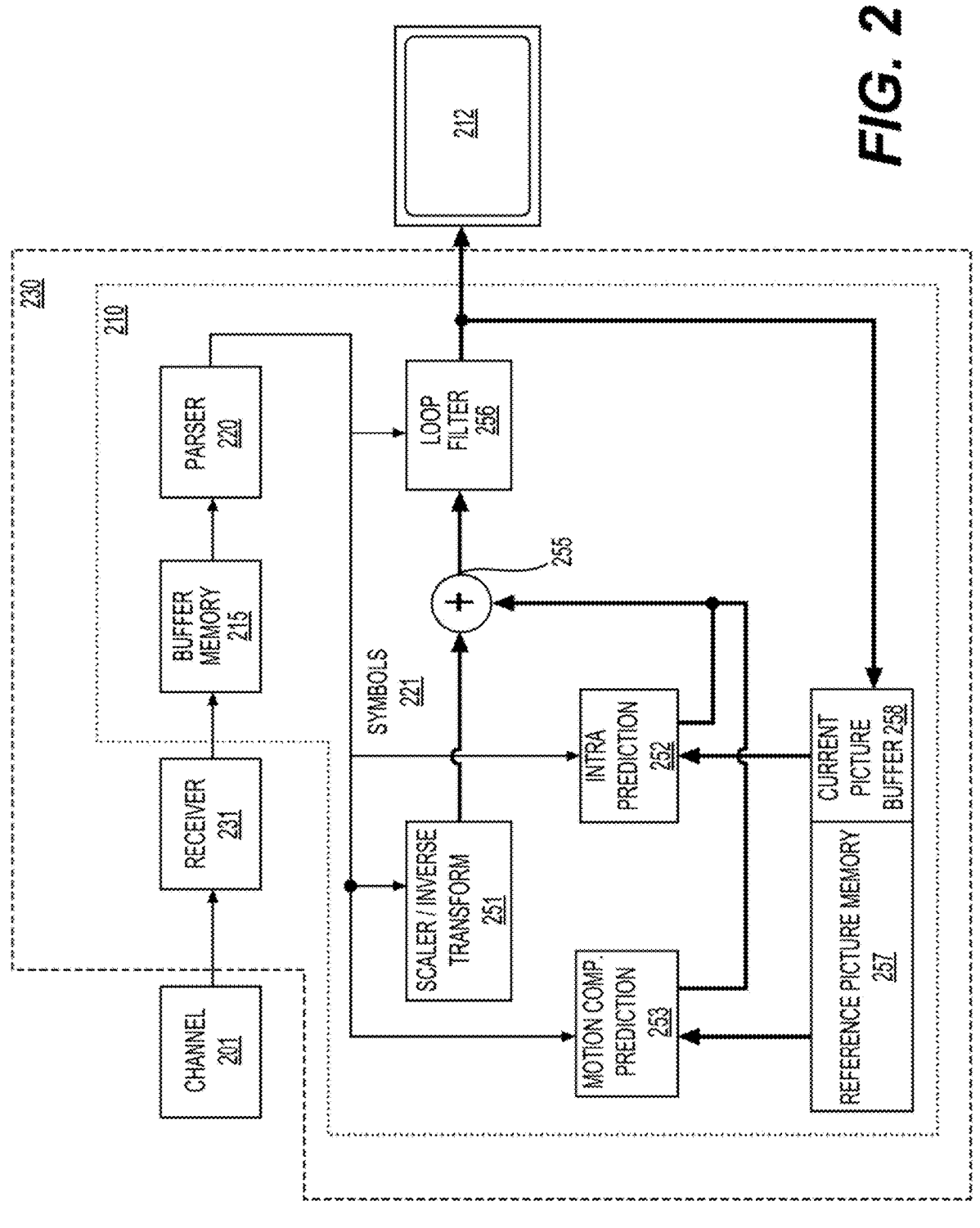
FIG. 2 is a schematic illustration of an exemplary block diagram of a decoder.

FIG. 2 shows an exemplary block diagram of a video decoder (210). The video decoder (210) can be included in an electronic device (230). The electronic device (230) can include a receiver (231) (e.g., receiving circuitry). The video decoder (210) can be used in the place of the video decoder (110) in the FIG. 1 example.

The receiver (231) may receive one or more coded video sequences, included in a bitstream for example, to be decoded by the video decoder (210). In an embodiment, one coded video sequence is received at a time, where the decoding of each coded video sequence is independent from the decoding of other coded video sequences. The coded video sequence may be received from a channel (201), which may be a hardware/software link to a storage device which stores the encoded video data. The receiver (231) may receive the encoded video data with other data, for example, coded audio data and/or ancillary data streams, that may be forwarded to their respective using entities (not depicted). The receiver (231) may separate the coded video sequence from the other data. To combat network jitter, a buffer memory (215) may be coupled in between the receiver (231) and an entropy decoder/parser (220) ("parser (220)" henceforth). In certain applications, the buffer memory (215) is part of the video decoder (210). In others, it can be outside of the video decoder (210) (not depicted). In still others, there can be a buffer memory (not depicted) outside of the video decoder (210), for example to combat network jitter, and in addition another buffer memory (215) inside the video decoder (210), for example to handle playout timing. When the receiver (231) is receiving data from a store/forward device of sufficient bandwidth and controllability, or from an isosynchronous network, the buffer memory (215) may not be needed, or can be small. For use on best effort packet networks such as the Internet, the buffer memory (215) may be required, can be comparatively large and can be advantageously of adaptive size, and may at least partially be implemented in an operating system or similar elements (not depicted) outside of the video decoder (210).

The video decoder (210) may include the parser (220) to reconstruct symbols (221) from the coded video sequence. Categories of those symbols include information used to manage operation of the video decoder (210), and potentially information to control a rendering device such as a render device (212) (e.g., a display screen) that is not an integral part of the electronic device (230) but can be coupled to the electronic device (230), as shown in FIG. 2. The control information for the rendering device(s) may be in the form of Supplemental Enhancement Information (SEI) messages or Video Usability Information (VUI) parameter set fragments (not depicted). The parser (220) may parse/entropy-decode the coded video sequence that is received. The coding of the coded video sequence can be in accordance with a video coding technology or standard, and can follow various principles, including variable length coding, Huffman coding, arithmetic coding with or without context sensitivity, and so forth. The parser (220) may extract from the coded video sequence, a set of subgroup parameters for at least one of the subgroups of pixels in the video decoder, based upon at least one parameter corresponding to the group. Subgroups can include Groups of Pictures (GOPs), pictures, tiles, slices, macroblocks, Coding Units (CUs), blocks, Transform Units (TUs), Prediction Units (PUs) and so forth. The parser (220) may also extract from the coded video sequence information such as transform coefficients, quantizer parameter values, motion vectors, and so forth.

The parser (220) may perform an entropy decoding/parsing operation on the video sequence received from the buffer memory (215), so as to create symbols (221).

Reconstruction of the symbols (221) can involve multiple different units depending on the type of the coded video picture or parts thereof (such as: inter and intra picture, inter and intra block), and other factors. Which units are involved, and how, can be controlled by subgroup control information parsed from the coded video sequence by the parser (220). The flow of such subgroup control information between the parser (220) and the multiple units below is not depicted for clarity.

Beyond the functional blocks already mentioned, the video decoder (210) can be conceptually subdivided into a number of functional units as described below. In a practical implementation operating under commercial constraints, many of these units interact closely with each other and can, at least partly, be integrated into each other. However, for the purpose of describing the disclosed subject matter, the conceptual subdivision into the functional units below is appropriate.

A first unit is the scaler/inverse transform unit (251). The scaler/inverse transform unit (251) receives a quantized transform coefficient as well as control information, including which transform to use, block size, quantization factor, quantization scaling matrices, etc. as symbol(s) (221) from the parser (220). The scaler/inverse transform unit (251) can output blocks comprising sample values, that can be input into aggregator (255).

In some cases, the output samples of the scaler/inverse transform unit (251) can pertain to an intra coded block. The intra coded block is a block that is not using predictive information from previously reconstructed pictures, but can use predictive information from previously reconstructed parts of the current picture. Such predictive information can be provided by an intra picture prediction unit (252). In some cases, the intra picture prediction unit (252) generates a block of the same size and shape of the block under reconstruction, using surrounding already reconstructed information fetched from the current picture buffer (258). The current picture buffer (258) buffers, for example, partly reconstructed current picture and/or fully reconstructed current picture. The aggregator (255), in some cases, adds, on a per sample basis, the prediction information the intra prediction unit (252) has generated to the output sample information as provided by the scaler/inverse transform unit (251).

In other cases, the output samples of the scaler/inverse transform unit (251) can pertain to an inter coded, and potentially motion compensated, block. In such a case, a motion compensation prediction unit (253) can access reference picture memory (257) to fetch samples used for prediction. After motion compensating the fetched samples in accordance with the symbols (221) pertaining to the block, these samples can be added by the aggregator (255) to the output of the scaler/inverse transform unit (251) (in this case called the residual samples or residual signal) so as to generate output sample information. The addresses within the reference picture memory (257) from where the motion compensation prediction unit (253) fetches prediction samples can be controlled by motion vectors, available to the motion compensation prediction unit (253) in the form of symbols (221) that can have, for example X, Y, and reference picture components. Motion compensation also can include interpolation of sample values as fetched from the reference picture memory (257) when sub-sample exact motion vectors are in use, motion vector prediction mechanisms, and so forth.

The output samples of the aggregator (255) can be subject to various loop filtering techniques in the loop filter unit (256). Video compression technologies can include in-loop filter technologies that are controlled by parameters included in the coded video sequence (also referred to as coded video bitstream) and made available to the loop filter unit (256) as symbols (221) from the parser (220). Video compression can also be responsive to meta-information obtained during the decoding of previous (in decoding order) parts of the coded picture or coded video sequence, as well as responsive to previously reconstructed and loop-filtered sample values.

The output of the loop filter unit (256) can be a sample stream that can be output to the render device (212) as well as stored in the reference picture memory (257) for use in future inter-picture prediction.

Certain coded pictures, once fully reconstructed, can be used as reference pictures for future prediction. For example, once a coded picture corresponding to a current picture is fully reconstructed and the coded picture has been identified as a reference picture (by, for example, the parser (220)), the current picture buffer (258) can become a part of the reference picture memory (257), and a fresh current picture buffer can be reallocated before commencing the reconstruction of the following coded picture.

The video decoder (210) may perform decoding operations according to a predetermined video compression technology or a standard, such as ITU-T Rec. H.265. The coded video sequence may conform to a syntax specified by the video compression technology or standard being used, in the sense that the coded video sequence adheres to both the syntax of the video compression technology or standard and the profiles as documented in the video compression technology or standard. Specifically, a profile can select certain tools as the only tools available for use under that profile from all the tools available in the video compression technology or standard. Also necessary for compliance can be that the complexity of the coded video sequence is within bounds as defined by the level of the video compression technology or standard. In some cases, levels restrict the maximum picture size, maximum frame rate, maximum reconstruction sample rate (measured in, for example mega-samples per second), maximum reference picture size, and so on. Limits set by levels can, in some cases, be further restricted through Hypothetical Reference Decoder (HRD) specifications and metadata for HRD buffer management signaled in the coded video sequence.

In an embodiment, the receiver (231) may receive additional (redundant) data with the encoded video. The additional data may be included as part of the coded video sequence(s). The additional data may be used by the video decoder (210) to properly decode the data and/or to more accurately reconstruct the original video data. Additional data can be in the form of, for example, temporal, spatial, or signal noise ratio (SNR) enhancement layers, redundant slices, redundant pictures, forward error correction codes, and so on.

Figure 3:
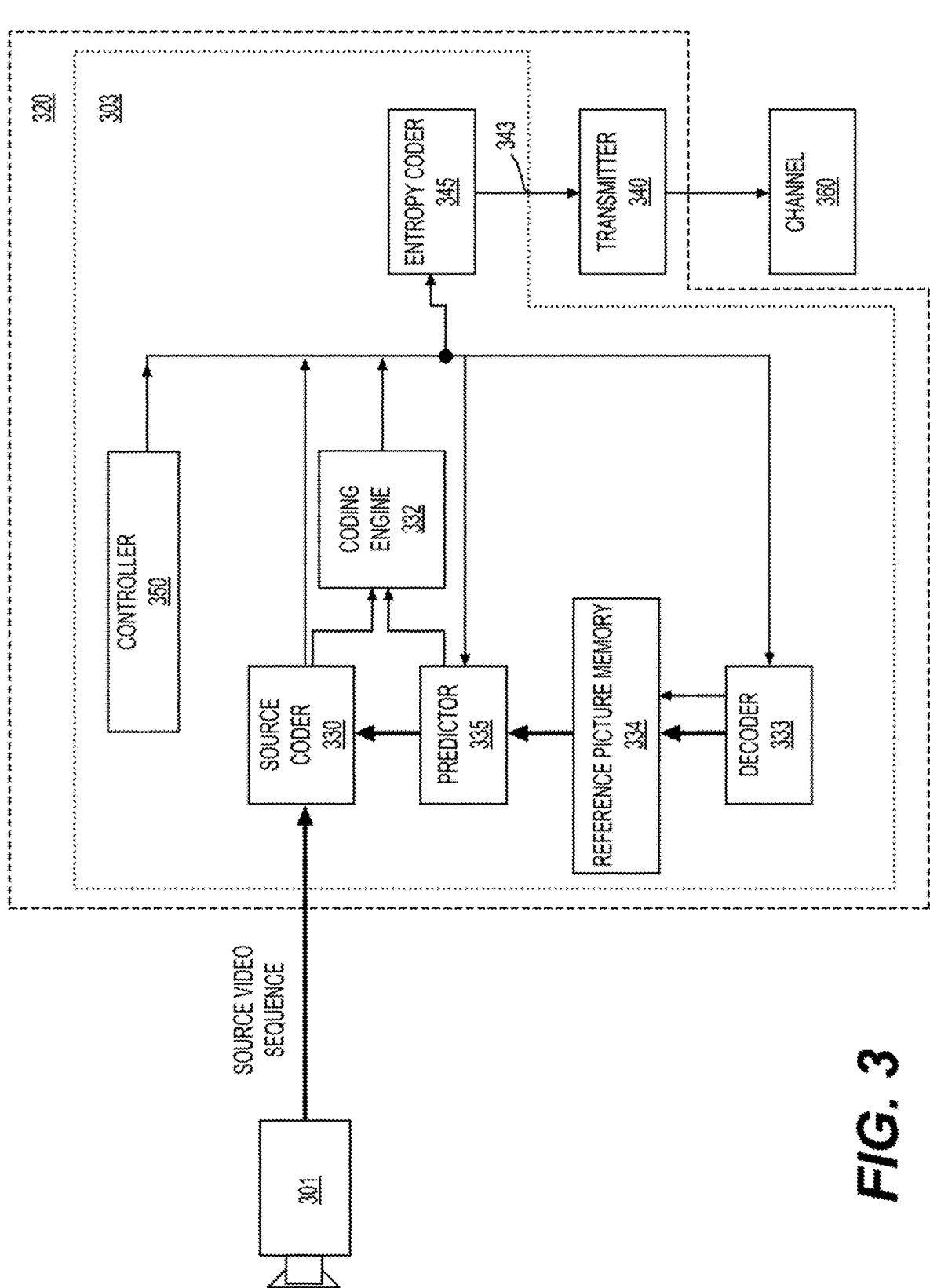
FIG. 3 is a schematic illustration of an exemplary block diagram of an encoder.

FIG. 3 shows an exemplary block diagram of a video encoder (303). The video encoder (303) is included in an electronic device (320). The electronic device (320) includes a transmitter (340) (e.g., transmitting circuitry). The video encoder (303) can be used in the place of the video encoder (103) in the FIG. 1 example.

The video encoder (303) may receive video samples from a video source (301) (that is not part of the electronic device (320) in the FIG. 3 example) that may capture video image(s) to be coded by the video encoder (303). In another example, the video source (301) is a part of the electronic device (320).

The video source (301) may provide the source video sequence to be coded by the video encoder (303) in the form of a digital video sample stream that can be of any suitable bit depth (for example: 8 bit, 10 bit, 12 bit, . . . ), any colorspace (for example, BT.601 Y CrCB, RGB, . . . ), and any suitable sampling structure (for example Y CrCb 4:2:0, Y CrCb 4:4:4). In a media serving system, the video source (301) may be a storage device storing previously prepared video. In a videoconferencing system, the video source (301) may be a camera that captures local image information as a video sequence. Video data may be provided as a plurality of individual pictures that impart motion when viewed in sequence. The pictures themselves may be organized as a spatial array of pixels, wherein each pixel can comprise one or more samples depending on the sampling structure, color space, etc. in use. The description below focuses on samples.

According to an embodiment, the video encoder (303) may code and compress the pictures of the source video sequence into a coded video sequence (343) in real time or under any other time constraints as required. Enforcing appropriate coding speed is one function of a controller (350). In some embodiments, the controller (350) controls other functional units as described below and is functionally coupled to the other functional units. The coupling is not depicted for clarity. Parameters set by the controller (350) can include rate control related parameters (picture skip, quantizer, lambda value of rate-distortion optimization techniques, . . . ), picture size, group of pictures (GOP) layout, maximum motion vector search range, and so forth. The controller (350) can be configured to have other suitable functions that pertain to the video encoder (303) optimized for a certain system design.

In some embodiments, the video encoder (303) is configured to operate in a coding loop. As an oversimplified description, in an example, the coding loop can include a source coder (330) (e.g., responsible for creating symbols, such as a symbol stream, based on an input picture to be coded, and a reference picture(s)), and a (local) decoder (333) embedded in the video encoder (303). The decoder (333) reconstructs the symbols to create the sample data in a similar manner as a (remote) decoder also would create. The reconstructed sample stream (sample data) is input to the reference picture memory (334). As the decoding of a symbol stream leads to bit-exact results independent of decoder location (local or remote), the content in the reference picture memory (334) is also bit exact between the local encoder and remote encoder. In other words, the prediction part of an encoder "sees" as reference picture samples exactly the same sample values as a decoder would "see" when using prediction during decoding. This fundamental principle of reference picture synchronicity (and resulting drift, if synchronicity cannot be maintained, for example because of channel errors) is used in some related arts as well.

The operation of the "local" decoder (333) can be the same as a "remote" decoder, such as the video decoder (210), which has already been described in detail above in conjunction with FIG. 2. Briefly referring also to FIG. 2, however, as symbols are available and encoding/decoding of symbols to a coded video sequence by an entropy coder (345) and the parser (220) can be lossless, the entropy decoding parts of the video decoder (210), including the buffer memory (215), and parser (220) may not be fully implemented in the local decoder (333).

In an embodiment, a decoder technology except the parsing/entropy decoding that is present in a decoder is present, in an identical or a substantially identical functional form, in a corresponding encoder. Accordingly, the disclosed subject matter focuses on decoder operation. The description of encoder technologies can be abbreviated as they are the inverse of the comprehensively described decoder technologies. In certain areas a more detail description is provided below.

During operation, in some examples, the source coder (330) may perform motion compensated predictive coding, which codes an input picture predictively with reference to one or more previously coded picture from the video sequence that were designated as "reference pictures." In this manner, the coding engine (332) codes differences between pixel blocks of an input picture and pixel blocks of reference picture(s) that may be selected as prediction reference(s) to the input picture.

The local video decoder (333) may decode coded video data of pictures that may be designated as reference pictures, based on symbols created by the source coder (330). Operations of the coding engine (332) may advantageously be lossy processes. When the coded video data may be decoded at a video decoder (not shown in FIG. 3), the reconstructed video sequence typically may be a replica of the source video sequence with some errors. The local video decoder (333) replicates decoding processes that may be performed by the video decoder on reference pictures and may cause reconstructed reference pictures to be stored in the reference picture memory (334). In this manner, the video encoder (303) may store copies of reconstructed reference pictures locally that have common content as the reconstructed reference pictures that will be obtained by a far-end video decoder (absent transmission errors).

The predictor (335) may perform prediction searches for the coding engine (332). That is, for a new picture to be coded, the predictor (335) may search the reference picture memory (334) for sample data (as candidate reference pixel blocks) or certain metadata such as reference picture motion vectors, block shapes, and so on, that may serve as an appropriate prediction reference for the new pictures. The predictor (335) may operate on a sample block-by-pixel block basis to find appropriate prediction references. In some cases, as determined by search results obtained by the predictor (335), an input picture may have prediction references drawn from multiple reference pictures stored in the reference picture memory (334).

The controller (350) may manage coding operations of the source coder (330), including, for example, setting of parameters and subgroup parameters used for encoding the video data.

Output of all aforementioned functional units may be subjected to entropy coding in the entropy coder (345). The entropy coder (345) translates the symbols as generated by the various functional units into a coded video sequence, by applying lossless compression to the symbols according to technologies such as Huffman coding, variable length coding, arithmetic coding, and so forth.

The transmitter (340) may buffer the coded video sequence(s) as created by the entropy coder (345) to prepare for transmission via a communication channel (360), which may be a hardware/software link to a storage device which would store the encoded video data. The transmitter (340) may merge coded video data from the video encoder (303) with other data to be transmitted, for example, coded audio data and/or ancillary data streams (sources not shown).

The controller (350) may manage operation of the video encoder (303). During coding, the controller (350) may assign to each coded picture a certain coded picture type, which may affect the coding techniques that may be applied to the respective picture. For example, pictures often may be assigned as one of the following picture types:

An Intra Picture (I picture) may be coded and decoded without using any other picture in the sequence as a source of prediction. Some video codecs allow for different types of intra pictures, including, for example Independent Decoder Refresh ("IDR") Pictures.

A predictive picture (P picture) may be coded and decoded using intra prediction or inter prediction using a motion vector and reference index to predict the sample values of each block.

A bi-directionally predictive picture (B Picture) may be coded and decoded using intra prediction or inter prediction using two motion vectors and reference indices to predict the sample values of each block. Similarly, multiple-predictive pictures can use more than two reference pictures and associated metadata for the reconstruction of a single block.

Source pictures commonly may be subdivided spatially into a plurality of sample blocks (for example, blocks of 4×4, 8×8, 4×8, or 16×16 samples each) and coded on a block-by-block basis. Blocks may be coded predictively with reference to other (already coded) blocks as determined by the coding assignment applied to the blocks' respective pictures. For example, blocks of I pictures may be coded non-predictively or they may be coded predictively with reference to already coded blocks of the same picture (spatial prediction or intra prediction). Pixel blocks of P pictures may be coded predictively, via spatial prediction or via temporal prediction with reference to one previously coded reference picture. Blocks of B pictures may be coded predictively, via spatial prediction or via temporal prediction with reference to one or two previously coded reference pictures.

The video encoder (303) may perform coding operations according to a predetermined video coding technology or standard, such as ITU-T Rec. H.265. In its operation, the video encoder (303) may perform various compression operations, including predictive coding operations that exploit temporal and spatial redundancies in the input video sequence. The coded video data, therefore, may conform to a syntax specified by the video coding technology or standard being used.

In an embodiment, the transmitter (340) may transmit additional data with the encoded video. The source coder (330) may include such data as part of the coded video sequence. Additional data may comprise temporal/spatial/SNR enhancement layers, other forms of redundant data such as redundant pictures and slices, SEI messages, VUI parameter set fragments, and so on.

A video may be captured as a plurality of source pictures (video pictures) in a temporal sequence. Intra-picture prediction (often abbreviated to intra prediction) makes use of spatial correlation in a given picture, and inter-picture prediction makes uses of the (temporal or other) correlation between the pictures. In an example, a specific picture under encoding/decoding, which is referred to as a current picture, is partitioned into blocks. When a block in the current picture is similar to a reference block in a previously coded and still buffered reference picture in the video, the block in the current picture can be coded by a vector that is referred to as a motion vector. The motion vector points to the reference block in the reference picture, and can have a third dimension identifying the reference picture, in case multiple reference pictures are in use.

In some embodiments, a bi-prediction technique can be used in the inter-picture prediction. According to the bi-prediction technique, two reference pictures, such as a first reference picture and a second reference picture that are both prior in decoding order to the current picture in the video (but may be in the past and future, respectively, in display order) are used. A block in the current picture can be coded by a first motion vector that points to a first reference block in the first reference picture, and a second motion vector that points to a second reference block in the second reference picture. The block can be predicted by a combination of the first reference block and the second reference block.

Further, a merge mode technique can be used in the inter-picture prediction to improve coding efficiency.

According to some embodiments of the disclosure, predictions, such as inter-picture predictions and intra-picture predictions, are performed in the unit of blocks. For example, according to the HEVC standard, a picture in a sequence of video pictures is partitioned into coding tree units (CTU) for compression, the CTUs in a picture have the same size, such as 64×64 pixels, 32×32 pixels, or 16×16 pixels. In general, a CTU includes three coding tree blocks (CTBs), which are one luma CTB and two chroma CTBs. Each CTU can be recursively quadtree split into one or multiple coding units (CUs). For example, a CTU of 64×64 pixels can be split into one CU of 64×64 pixels, or 4 CUs of 32×32 pixels, or 16 CUs of 16×16 pixels. In an example, each CU is analyzed to determine a prediction type for the CU, such as an inter prediction type or an intra prediction type. The CU is split into one or more prediction units (PUs) depending on the temporal and/or spatial predictability. Generally, each PU includes a luma prediction block (PB), and two chroma PBs. In an embodiment, a prediction operation in coding (encoding/decoding) is performed in the unit of a prediction block. Using a luma prediction block as an example of a prediction block, the prediction block includes a matrix of values (e.g., luma values) for pixels, such as 8×8 pixels, 16×16 pixels, 8×16 pixels, 16×8 pixels, and the like.

It is noted that the video encoders (103) and (303), and the video decoders (110) and (210) can be implemented using any suitable technique. In an embodiment, the video encoders (103) and (303) and the video decoders (110) and (210) can be implemented using one or more integrated circuits. In another embodiment, the video encoders (103) and (303), and the video decoders (110) and (210) can be implemented using one or more processors that execute software instructions.

This disclosure includes aspects related to template-matching based adaptive block vector resolution (ABVR) in intra block copy (IBC).

IBC is adopted in HEVC extensions on screen content coding (SCC). IBC can significantly improve the coding efficiency of screen content materials. Since IBC mode can be implemented as a block level coding mode, block matching (BM) can be performed at an encoder to find an optimal block vector (or motion vector) for each CU. Here, a block vector can be used to indicate a displacement from a current block to a reference block, where the reference block was already reconstructed inside a current picture. A luma block vector of an IBC-coded CU can be defined using an integer precision. A chroma block vector can be rounded to the integer precision as well. When combined with adaptive motion vector resolution (AMVR), the IBC mode can switch between 1-pel and 4-pel motion vector precisions. An IBC-coded CU can be treated as a third prediction mode other than an intra or an inter prediction modes. The IBC mode can be applicable to CUs with both a width and a height smaller than or equal to a constant value, such as 64 luma samples.

At an encoder side, a hash-based motion estimation can be performed for IBC. The encoder can perform a rate distortion (RD) check for blocks with either a width or a height no larger than a threshold value, such as 16 luma samples. For a non-merge mode, a block vector search can be performed using the hash-based search first. If the hash search does not return a valid candidate, a block matching based local search can be performed.

In the hash-based search, hash key matching (e.g., 32-bit CRC) between the current block and a reference block can be extended to other block sizes, such as all allowed block sizes. A hash key calculation for every position in the current picture can be based on subblocks, such as 4×4 subblocks. When the current block has a larger size, a hash key of the current block can be determined to match a hash key of the reference block when all hash keys of all 4×4 subblocks of the current block match the hash keys in the corresponding reference locations. If hash keys of multiple reference blocks are found to match the hash key of the current block, a block vector cost of each matched reference can be calculated and the one with a minimum cost can be selected.

In a block matching search, a search range can be set to cover both the previous and current CTUs.

At a CU level, IBC mode can be signalled with a flag and the IBC mode can be signaled as IBC AMVP mode or IBC skip/merge mode as follows:
  (1) IBC skip/merge mode: a merge candidate index is used to indicate which one of the block vectors in the list from neighboring candidate IBC coded blocks can be used to predict the current block. The merge list can include spatial, HMVP, and pairwise candidates, for example.
  (2) IBC AMVP mode: a block vector difference can be coded in the same way as a motion vector difference. The block vector prediction method can use two candidates as predictors, one from a left neighbor and one from an above neighbor (if IBC coded). When either neighbor is not available, a default block vector can be used as a predictor. A flag can further be signaled to indicate the block vector predictor index.

In order to further improve the compression efficiency of VVC standard, JVET-U0100 and EE2 planned to be performed between $21^{st}$ and $22^{nd}$ JVET meetings to evaluate the enhanced compression tools beyond VVC capability. Template matching (TM) which refines a motion at a decoder side was proposed in JVET-U010 and EE2. In TM mode, a motion can be refined by constructing a template from left and/or above neighboring reconstructed samples and finding a closest matching between the template in the current picture and a corresponding template in the reference frame.

Figure 4:
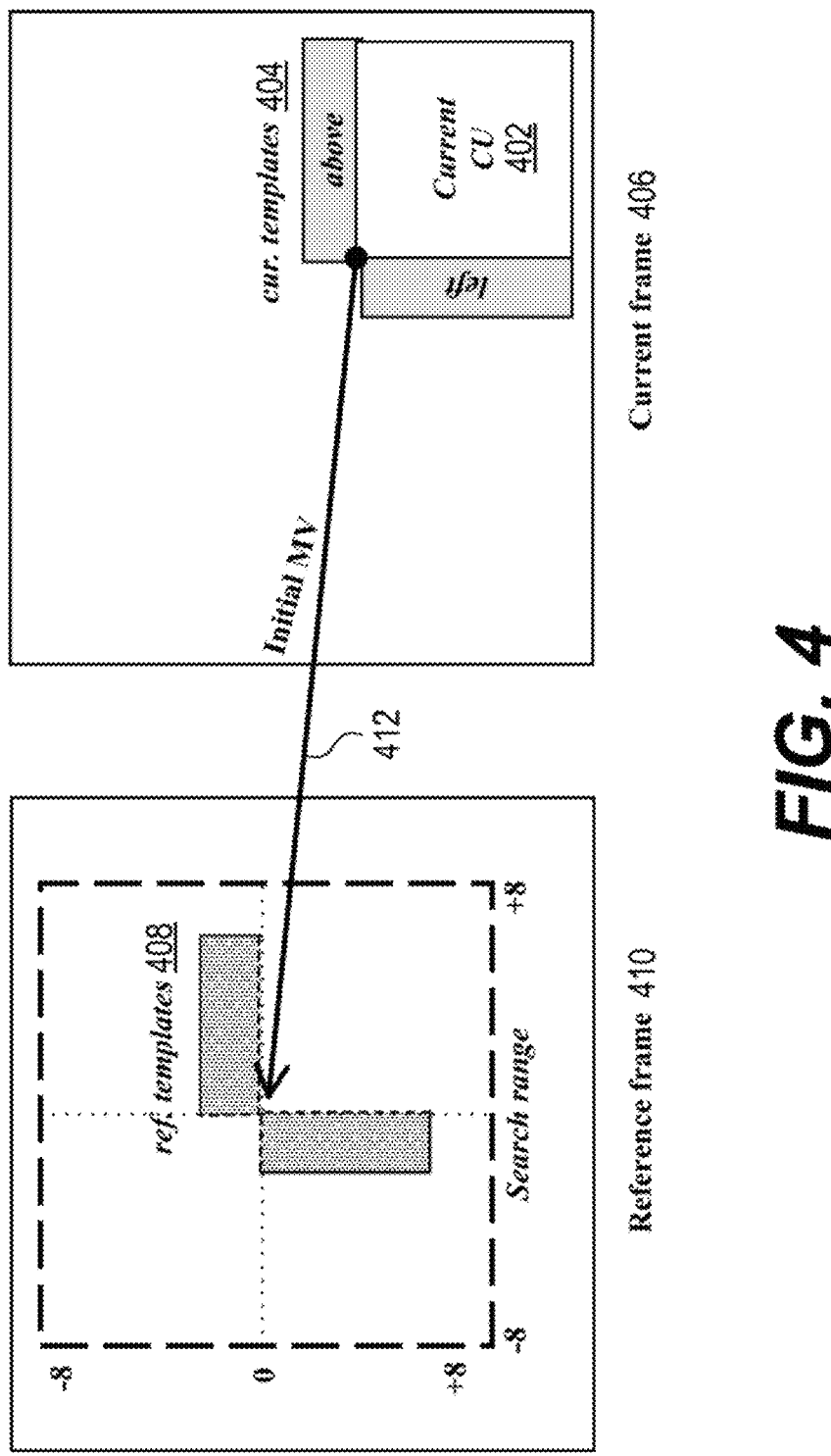
FIG. 4 is a schematic illustration of a template matching process.

As shown in FIG. 4, a current block (402) can include a template (or current templates) (404) that includes top and left neighboring blocks of the current block (402) in a current frame (406). A block (or reference templates) (408) in a reference frame (410) can be indicated by an initial MV (412). A better MV (not shown) can be searched (identified) around the initial motion vector (412) of the current CU (402) within a [−8, +8]-pel search range. The template matching method, such as in JVET-J0021 and EE2, can be applied with modifications as follows:
  (1) A search step size can be determined based on AMVR mode; and
  (2) TM can be cascaded with a bilateral matching process in merge modes.

According to an adaptive block vector resolution (ABVR) mode, additional ABVR signaling can be introduced for a number of BV precisions (also referred to as BV resolutions), such as ½-pel and ¼-pel BV precisions, for a block coded with IBC advanced motion vector prediction (AMVP). In an example, a BV can indicate an initial reference block of a current block, and a BV precision associated with the BV can indicate a candidate reference block near the initial reference block. The plurality of BV precisions (or resolutions) can indicate a search range such that a more suitable BV, which indicates a reference block with a least difference from the current block, can be selected. When a fractional BV precision (e.g., ½-pel) is enabled, the corresponding BVPs and BVDs can be in the unit of the selected precision. At an encoder side, integer BV searching methods can be performed first and a group of N integer BVs can then be selected for further fractional refinement, where ½-pel and ¼-pel BV searching can be sequentially applied. The BV with a minimum RD cost, either at an integer precision or a fractional precision, can be signaled to a decoder side. In an exemplary design, 8-tap DCT-IF interpolation filters can be applied to generate the IBC prediction samples at fractional sample positions. Moreover, when the interpolation process accesses reconstructed samples beyond the available reference area, padding operations can be conducted. The padding operations can copy samples from a nearest integer sample position within the valid reference area. For IBC merge mode, fractional BVs can be inherited through spatial neighbors, which can be similar to an existing IBC inheritance process in ECM, such as in the ECM-7.0.

In ECM, template matching is widely adopted to refine the motion information of the MVP candidate in a AMVP mode and merge candidate in a merge mode. The template matching is also used to reorder the MVP candidate in AMVP mode. For IBC, the adaptive motion vector resolution (AMVR) was also studied in ECM. However, the BV resolution index in an adaptive BV resolution (ABVR) mode is still coded in a fixed order in IBC.

In the disclosure, template matching (TM) based ABVR in IBC is provided. According to the IBC, a BV can be provided to indicate an initial reference block. A plurality of BV precisions associated with the BV can be introduced, according to the ABVR. Each of the BV precisions can indicate a respective reference block around the initial reference block. The plurality of BV precisions can further be reordered according to the TM.

In an aspect, the TM for the reordering of the BV precision indices is applied in IBC AMVP mode. The TM search procedure is performed at possible BV precisions to reorder the BV resolution indices in ascending order by using the TM cost between the template and the reference block when the sps_abvr_enabled_flag is true.

In an embodiment, TM can be applied for reordering the BV precision indices in a prediction mode, such as in IBC AMVP mode. Each of the BV precision indices can indicate a respective BV precision, such as ¼-pel, ½-pel, and 1-pel. The TM search procedure can be performed on possible BV precisions associated with a BV of the IBC to reorder the BV resolution indices in a pre-defined order (e.g., an ascending order) by using a TM cost (or TM difference) between a template of a current block and a template of a reference block. In an example, the TM search procedure can be performed when an ABVR enable flag (e.g., sps_abvr_enabled_flag) is received and is true. When the ABVR enable flag is true, the ABVR mode can be applied to the current block and a plurality of BV precisions associated with the BV can be applied.

In an aspect, the TM is applied for all BV precisions including but not limited to ¼-pel, ½-pel, and 1-pel. The TM search procedure is performed at all BV resolutions and then the BV precisions are reordered in ascending order by using the TM cost between the template and the reference block with the corresponding BV resolution. The tm_abvr_ flag being false indicates that the BV resolution with the smallest TM cost is selected. When the tm_abvr_flag is true, tm_abvr_precision_idx is further signaled. The selected ABVR precision is derived from the remaining BV resolutions which are reordered in ascending order of TM cost. The detailed description of pseudo syntax is shown in Table 1 as follows.

In an embodiment, the TM can be applied to a plurality of, such as for all, BV precisions including but not limit to ¼-pel, ½-pel, and 1-pel. The TM search procedure can be performed on the plurality of BV resolutions (or precisions) and then the BV precisions can be reordered in a predefined order, such as an ascending order, by using the TM costs between the template of a current block and the reference blocks of the current block that correspond to the BV resolutions. In an example, based on an initial BV that indicates an initial point, a plurality of BV resolutions around the initial point can be determined. Each BV resolution can correspond to a respective reference block. TM can further be applied to reorder the BV resolutions. For example, TM costs (or TM differences) between a template of a current block and a template of each of the reference blocks that are indicated by the BV precisions can be determined. The BV precisions can be reordered based on the TM costs in a pre-defined order, such as an ascending order.

Table 1 shows an exemplary TM based ABVR in IBC. As shown in Table 1, a TM based ABVR flag (e.g., tm_abvr_ flag) can be signaled. When the tm_abvr_flag is false, a BV resolution corresponding to a predetermined TM cost, such as a smallest TM cost, can be selected. When the tm_abvr_ flag is true, the BV precision corresponding to the minimum TM cost can be excluded from the plurality of BV precisions, and remaining BV precisions can further be reordered based on the corresponding TM costs. Further, TM based precision index information (e.g., tm_abvr_precision_idx) can be signaled. A selected ABVR precision can be derived based on the tm_abvr_precision_idx from the remaining BV resolutions which are reordered in a pre-defined order (e.g., an ascending order) of the TM costs.

TABLE 1

| Exemplary syntax elements associated with TM based ABVR in IBC |
| --- |
| if( sps_abvr_enabled_flag && <br>    ( MvdL0[ x0 ][ y0 ][ 0 ] != 0 \|\| MvdL0[ x0 ][ y0 ][ 1 ] != 0 ) ) <br>   tm_abvr_flag[ x0 ][ y0 ] <br>   if(tm_abvr_flag[ x0 ][ y0 ] ) <br>     tm_abvr_precision_idx[ x0 ][ y0 ] |

In an aspect, the TM is applied for all BV precisions including but not limited to ¼-pel, ½-pel, and 1-pel. The TM search procedure is performed at all BV resolutions and then the BV precisions are reordered in ascending order by using the TM cost between the template and the reference block with the corresponding BV resolution. When the TM-based reordering of ABVR mode is signaled in the high-level syntax, such as but not limited to SPS, PPS, Slice header, etc., the selected ABVR precision is derived from the BV resolutions which are reordered in ascending order of TM cost. The detailed description of pseudo syntax is shown in Table 2 as follows.

In an embodiment, the TM can be applied to a plurality of, such as for all, BV precisions including but not limited to ¼-pel, ½-pel, and 1-pel. The TM search procedure can be performed on the plurality BV resolutions and then the BV precisions can be reordered in a pre-defined order (e.g., an ascending order) by using the TM costs between the template of the current block and the templates of the reference blocks corresponding to the BV resolutions. When the TM-based reordering of ABVR mode is signaled in a high-level syntax, such as but not limited to the SPS, PPS, slice header, or the like, the selected ABVR precision can be derived based on precision index information, such as TM based precision index information (e.g., tm_abvr_precision_ idx) or ABVR based precision index information (e.g., abvr_precision_idx), from the BV resolutions which are reordered in the predefined order (e.g., ascending order) of the TM costs. In an example, the BV precision corresponding to a minimum TM cost among the TM costs can be selected from the reordered BV resolutions according to the precision index information.

TABLE 2

Exemplary syntax elements associated
with TM based ABVR in IBC if( sps_abvr_enabled_flag &&
  ( MvdL0[ x0 ][ y0 ][ 0 ] != 0 || MvdL0[ x0 ][ y0 ][ 1 ] != 0 ) )
  tm_abvr_precision_idx[ x0 ][ y0 ]

Table 2 shows another exemplary TM based ABVR in IBC. Assuming that coding information signaled in a video bitstream indicates that an intra block copy (IBC) mode is applied to the current block, as shown in Table 2, when an ABVR enable flag (e.g., sps_abvr_enbabled_flag) is true (indicating the ABVR mode is applied) and MVD is not equal to zero, a TM cost (or TM difference) between a template of a current block and a template of each of the reference blocks of the current block can be determined. The reference blocks of the current block can be indicated by the BV precisions (or BV resolutions). The BV precisions can be reordered based on the TM costs in a pre-defined order, such as an ascending order. Further, precision index information (e.g., tm_abvr_precision_idx or abvr_precision_idx) can be signaled to indicate which one of the BV precisions is selected. For example, the precision index information can indicate a BV precision corresponding to a minimum TM cost can be selected as the ABVR precision. Table 2 shows TM based precision index information (e.g., tm_abvr_precision_idx) is signaled to indicate which one of the BV precisions is selected. However, ABVR based precision index information (e.g., abvr_precision_idx) can also be signaled to indicate which one of the BV precisions is selected.

In an aspect, the TM is applied for all possible BV precisions except for the ¼-pel when the abvr_flag is false. The TM search procedure is performed at the BV precisions including but not limited to ½-pel, and 1-pel, to reorder the BV precision indices in ascending order by using the TM cost between the template and the reference block with the corresponding BV resolution. The ABVR precision index is derived from the reordered BV precision indices. The detailed description of pseudo syntax is shown in Table 3 as follows.

In an embodiment, as shown in Table 3, the TM can be applied to a plurality of, such as for all, possible BV precisions except for a predefined BV precision. The predefined BV precision can be a most frequent resolution precision, such as ¼-pel, for example. When an ABVR flag (e.g., abvr_flag) is false, the TM search procedure can be performed on the BV precisions that exclude the predefined BV precision. Thus, the TM search procedure can be performed on the remaining BV precisions which can include but not limited to ½-pel, and 1-pel, to reorder the BV precision indices associated with the remaining BV precisions in a predefined order (e.g., an ascending order) by using the TM costs between the template of the current block and the template of the reference blocks that corresponds to the BV resolutions (e.g., each BV resolution corresponds to a reference block of the current block). The ABVR precision index (or TM based index information), such as tm_abvr_precision_idx, can further be derived from the reordered BV precision indices. The TM based precision index information (e.g., tm_abvr_precision_idx) can indicate which one of the BV precisions is selected. For example, a BV precision corresponding to a minimum TM cost can be selected as the ABVR precision.

TABLE 3

Exemplary syntax elements associated
with TM based ABVR in IBC if( sps_abvr_enabled_flag &&
  ( MvdL0[ x0 ][ y0 ][ 0 ] != 0 || MvdL0[ x0 ][ y0 ][ 1 ] != 0 ) )
  abvr_flag[ x0 ][ y0 ]
  if( abvr_flag[ x0 ][ y0 ] )
    tm_abvr_precision_idx[ x0 ][ y0 ]

Alternatively, the TM can be applied for all possible BV precisions except for 1-pel when the abvr_flag is false.

In an aspect, the TM procedure is applied for all possible BV precisions. When the ABVR precision with the smallest TM cost is chosen the tm_amvr_flag is set as true. Otherwise, the tm_amvr_flag is set as false and the regular ABVR signaling is further used. The detailed description of the pseudo syntax is shown in Table 4.

In an embodiment, as shown in Table 4, the TM procedure can be applied to a plurality of, such as for all, possible BV precisions. When the ABVR precision corresponding to a predetermined TM cost, such as the smallest TM cost, is chosen, the TM based ABVR flag (e.g., tm_abvr_flag) can be set as true. Otherwise, the tm_abvr_flag can be set as false and regular ABVR signaling can be further used. As shown in Table 4, when the TM based ABVR flag is false, an ABVR flag (e.g., abvr_flag) can be signaled. When the abvr_flag is true, ABVR based precision index information (e.g., abvr_precision_idx) can further be signaled to indicate which one of the BV precisions can be selected. The BV precisions can be ordered in a pre-defined sequence according to the ABVR mode.

TABLE 4

Exemplary syntax elements associated
with TM based ABVR in IBC if( sps_abvr_enabled_flag &&
  ( MvdL0[ x0 ][ y0 ][ 0 ] != 0 || MvdL0[ x0 ][ y0 ][ 1 ] != 0 ) )
  tm_abvr_flag[ x0 ][ y0 ]
  if(tm_abvr_flag[ x0 ][ y0 ] == 0) {
    abvr_flag[ x0 ][ y0 ]
    if(abvr_flag[ x0 ][ y0 ] )
      abvr_precision_idx[ x0 ][ y0 ]
  }

In an aspect, the ABVR flag is signaled firstly to indicate whether the ABVR is enabled or not. If the ABVR is enabled, the tm_abvr_flag is signaled to indicate whether the BV resolution with the smallest TM cost is selected. When the tm_abvr_flag is true, the ABVR precision except for the ¼-pel luma precision with the smallest TM cost is selected. When the tm_abvr_flag is set as false, the original signaling of MV resolution index is used. The detailed description of the pseudo syntax is shown in the following Table 5.

In an embodiment, as shown in Table 5, an ABVR flag (e.g., abvr_flag) can be signaled firstly to indicate whether the ABVR mode is enabled or not. The enabled ABVR can indicate a plurality of BV precisions are applied to a current block. If the ABVR is enabled, a TM based ABVR flag (e.g., tm_abvr_flag) can further be signaled to indicate whether the BV resolution corresponding to a predetermined TM cost, such as a smallest TM cost, is selected. When the tm_abvr_flag is true, the ABVR precision corresponding to a predetermined TM cost, such as the smallest TM cost, is selected. In an example, the ABVR precision can exclude a predefined precision, such as the ¼-pel luma precision. When the tm_abvr_flag is set as false, an original signaling of MV resolution index (or ABVR based precision index information), such as abvr_precision_idx, can be used. The ABVR based precision index information (e.g., abvr_precision_idx) can indicate which one of the BV precisions can be selected. The BV precisions can be ordered in a predefined sequence, for example that is not reordered based on TM cost, according to the ABVR mode.

TABLE 5

Exemplary syntax elements associated
with TM based ABVR in IBC

```
if( sps_abvr_enabled_flag &&
    ( MvdL0[ x0 ][ y0 ][ 0 ] != 0 || MvdL0[ x0 ][ y0 ][ 1 ] != 0 ) )
    abvr_flag[ x0 ][ y0 ]
    if( abvr_flag[ x0 ][ y0 ] ) {
        tm_abvr_flag[ x0 ][ y0 ]
        if(tm_abvr_flag[ x0 ][ y0 ] == 0)
            abvr_precision_idx[ x0 ][ y0 ]
    }
```

Alternatively, in an aspect, the ABVR precision except for the 1-pel luma precision with the smallest TM cost is selected when the tm_abvr_flag is true.

Alternatively, a precision such as the 1-pel luma precision can be excluded. Thus, the ABVR precision except for the 1-pel luma precision with a predetermined TM cost, such as the smallest TM cost, can be selected when the tm_abvr_flag is true.

Figure 5:
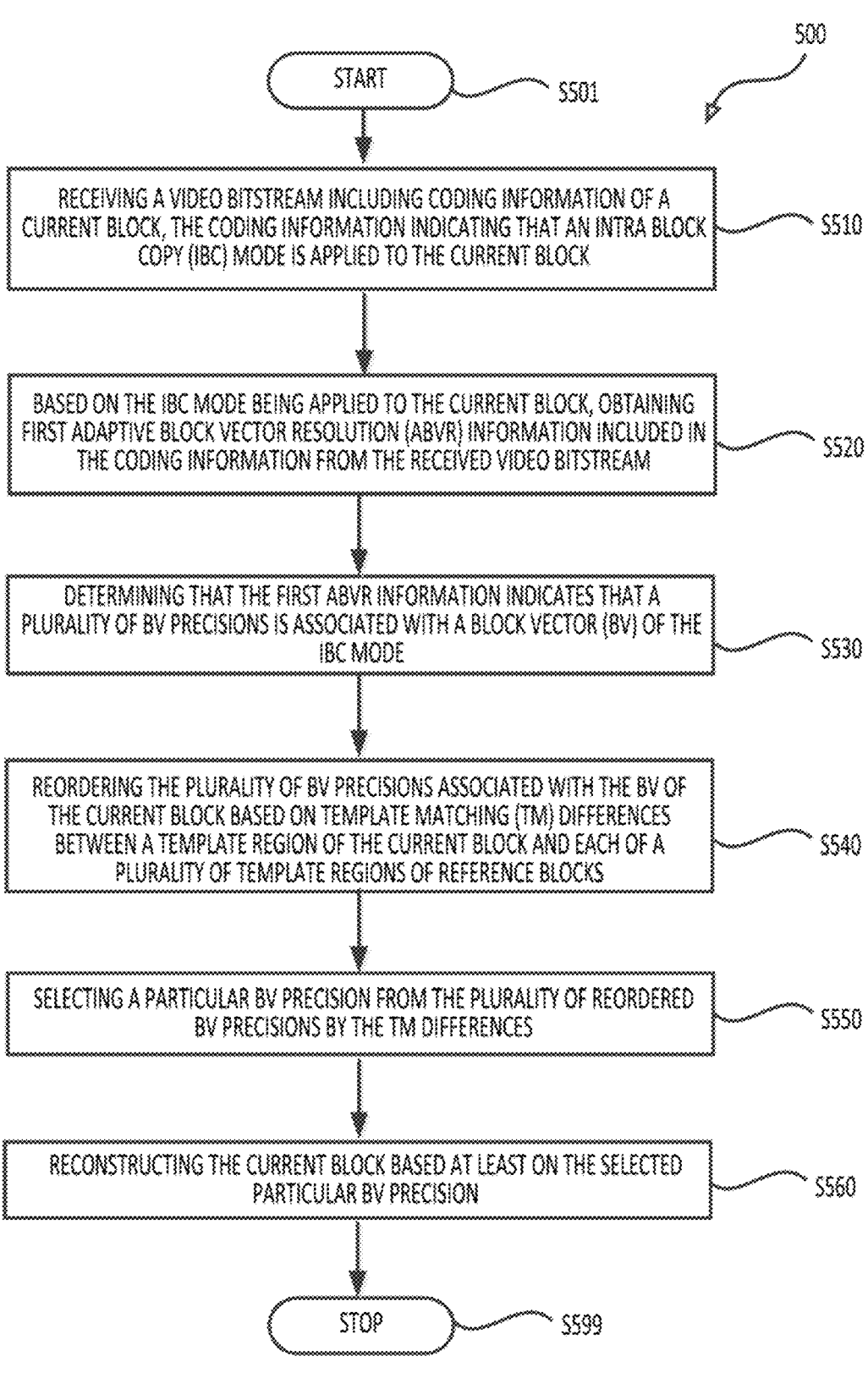
FIG. 5 shows a flow chart outlining a decoding process according to some embodiments of the disclosure.

FIG. 5 shows a flow chart outlining a process (500) according to an embodiment of the disclosure. The process (500) can be used in a video decoder. In various embodiments, the process (500) is executed by processing circuitry, such as the processing circuitry that performs functions of the video decoder (110), the processing circuitry that performs functions of the video decoder (210), and the like. In some embodiments, the process (500) is implemented in software instructions, thus when the processing circuitry executes the software instructions, the processing circuitry performs the process (500). The process starts at (S501) and proceeds to (S510).

At (S510), a video bitstream including coding information of a current block is received. The coding information indicates that an intra block copy (IBC) mode is applied to the current block.

At (S520), based on the IBC mode being applied to the current block, first adaptive block vector resolution (ABVR) information included in the coding information is obtained from the received video bitstream. In an example, as shown in Table 2, the first ABVR information includes tm_abvr_precision_idx. In an example, as shown in Tables 3 and 5, the first ABVR information incudes abvr_flag. In an example, as shown in Tables 1 and 4, the first ABVR information includes tm_abvr_flag.

At (S530), the first ABVR information is determined to indicate that a plurality of BV precisions is associated with a block vector (BV) of the IBC mode. For example, the first ABVR information in Table 2 includes first precision index information (e.g., tm_abvr_precision_idx) that indicates a particular BV precision is selected from a plurality of BV precisions based on template matching. In another example, the first ABVR information includes abvr_flag, such as in Tables 3 and 5, that indicates the ABVR mode is applied to the current block. According to the ABVR mode, a plurality of BV precisions associated with a BV of the IBC mode is determined.

At (S540), the plurality of BV precisions associated with the BV of the current block is reordered based on template matching (TM) differences between a template region of the current block and each of a plurality of template regions of reference blocks. For example, as shown in Table 1, the TM search procedure is performed at all BV resolutions and then the BV precisions are reordered in ascending order by using the TM cost between the template and the reference block with the corresponding BV resolution. In another example, as shown in Table 3, the TM search procedure is performed at the BV precisions including but not limited to ½-pel, and 1-pel, to reorder the BV precision indices in ascending order by using the TM cost between the template and the reference block with the corresponding BV resolution.

At (S550), a particular BV precision is selected from the plurality of reordered BV precisions by the TM differences. In an example, as shown in Table 1, the tm_abvr_flag being false indicates that the BV resolution with the smallest TM cost is selected. When the tm_abvr_flag is true, tm_abvr_precision_idx is further signaled. The selected ABVR precision (e.g., a particular BV precision) is derived from the remaining BV resolutions which are reordered in ascending order of TM cost.

At (S560), the current block is reconstructed based at least on the selected particular BV precision.

In an example, the TM differences between the template region of the current block and each of the template regions of the reference blocks of the current block associated with the plurality of BV precisions are determined. The template region of the current block includes samples over a top side and on a left side of the current block. The plurality of BV precisions is reordered based on the TM differences between the template region of the current block and the template regions of the reference blocks of the current block in an ascending order.

In an example, the first ABVR information includes first precision index information that indicates the particular BV precision corresponding to a minimum TM difference among the TM differences between the template region of the current block and the template regions of the reference blocks of the current block. The particular BV precision is further selected from the plurality of reordered BV precisions that corresponds to the minimum TM difference according to the first precision index information.

In an example, based on the IBC mode being applied to the current block and the first ABVR information indicating that the particular BV precision corresponds to a minimum TM difference among the TM differences, the particular BV precision is selected from the plurality of reordered BV precisions corresponding to the minimum TM difference among the TM differences between the template region of the current block and the template regions of the reference blocks of the current block.

In an example, based on the IBC mode being applied to the current block and the first ABVR information indicating that the particular precision does not correspond to the minimum TM difference, the particular BV precision is selected from the plurality of reordered BV precisions based on first precision index information included in the coding information. The first precision index information indicates that the particular BV precision corresponds to a second minimum difference among the TM differences between the template region of the current block and the template regions of the reference blocks of the current block.

In an example, based on the first ABVR information indicating that a predetermined BV precision is excluded from the plurality of BV precisions, a subset of the plurality of BV precisions that excludes the predetermined BV precision is reordered based on TM differences between the template region of the current block and template regions of a subset of the reference blocks of the current block that excludes a predetermined reference block corresponding to the predetermined BV precision in an ascending order.

In an example, the particular BV precision is selected from the plurality of reordered BV precisions based on first precision index information included in the coding information that indicates the particular BV precision corresponding to a minimum TM difference among the TM differences between the template region of the current block and the template regions of the subset of the reference blocks of the current block.

In an example, based on the first ABVR information indicating that the one of the plurality of BV precisions does not correspond to a minimum TM difference among the TM differences, whether second ABVR information of the coding information indicates that the plurality of BV precisions is ordered based on a pre-defined sequence is determined. Based on the second ABVR information indicating that the plurality of BV precisions is ordered according to the pre-defined sequence, the particular BV precision is selected from the plurality of BV precisions in the pre-defined sequence based on second precision index information that is included in the coding information and indicates which one of the plurality of BV precisions is selected.

In an example, based on the first ABVR information indicating that ABVR is enabled such that the plurality of BV precisions is ordered according to a pre-defined sequence, whether second ABVR information of the coding information indicates that the plurality of BV precisions is reordered based on the TM differences is determined. Based on the second ABVR information indicating that the plurality of BV precisions is reordered based on the TM differences, the particular BV precision is selected from the plurality of reordered BV precisions that corresponds to a minimum difference among the TM differences between the template region of the current block and the template regions of the reference blocks of the current block.

In an example, based on the first ABVR information indicating that the ABVR is enabled, whether the second ABVR information of the coding information indicates that the plurality of BV precisions is reordered based on the TM differences is determined. Based on the second ABVR information being determined as indicating that the plurality of BV precisions is not reordered based on the TM differences, the particular BV precision is selected from the plurality of BV precisions in a pre-defined sequence based on second precision index information that indicates which one of the plurality of BV precisions is selected.

Then, the process proceeds to (S599) and terminates.

The process (500) can be suitably adapted. Step(s) in the process (500) can be modified and/or omitted. Additional step(s) can be added. Any suitable order of implementation can be used.

FIG. 6 shows a flow chart outlining a process (600) according to an embodiment of the disclosure. The process (600) can be used in a video encoder. In various embodiments, the process (600) is executed by processing circuitry, such as the processing circuitry that performs functions of the video encoder (103), the processing circuitry that performs functions of the video encoder (303), and the like. In some embodiments, the process (600) is implemented in software instructions, thus when the processing circuitry executes the software instructions, the processing circuitry performs the process (600). The process starts at (S601) and proceeds to (S610).

At (S610), whether an intra block copy (IBC) mode is applied to a current block in a current picture is determined.

At (S620), based on the IBC mode being applied to the current block, a block vector (BV) and a plurality of BV precisions of the BV associated with the current block are determined. For example, as shown in Table 2, when the ABVR enable flag (e.g., sps_abvr_enabled_flag) is true, the ABVR mode can be applied to the current block and a plurality of BV precisions associated with the BV can be applied.

At (S630), the plurality of BV precisions of the BV associated with the current block is reordered based on template matching (TM) differences between a template region of the current block and each of a plurality of template regions of reference blocks of the current block associated with the plurality of BV precisions. For example, as shown in Table 2, the TM search procedure is performed at possible BV precisions to reorder the BV resolution indices in ascending order by using the TM cost between the template of the current block and the template of the reference block.

At (S640), first adaptive block vector resolution (ABVR) information is encoded in a video bitstream. The first ABVR information indicates that the current block is encoded based on one of the plurality of reordered BV precisions. In an example, as shown in Table 2, the first ABVR information includes tm_abvr_precision_idx. In an example, as shown in Tables 3 and 5, the first ABVR information incudes abvr_flag. In an example, as shown in Tables 1 and 4, the first ABVR information includes tm_abvr_flag.

Then, the process proceeds to (S699) and terminates.

The process (600) can be suitably adapted. Step(s) in the process (600) can be modified and/or omitted. Additional step(s) can be added. Any suitable order of implementation can be used.

The techniques described above, can be implemented as computer software using computer-readable instructions and physically stored in one or more computer-readable media. For example, FIG. 7 shows a computer system (700) suitable for implementing certain embodiments of the disclosed subject matter.

The computer software can be coded using any suitable machine code or computer language, that may be subject to assembly, compilation, linking, or like mechanisms to create code comprising instructions that can be executed directly, or through interpretation, micro-code execution, and the like, by one or more computer central processing units (CPUs), Graphics Processing Units (GPUs), and the like.

The instructions can be executed on various types of computers or components thereof, including, for example, personal computers, tablet computers, servers, smartphones, gaming devices, internet of things devices, and the like.

Figure 7:
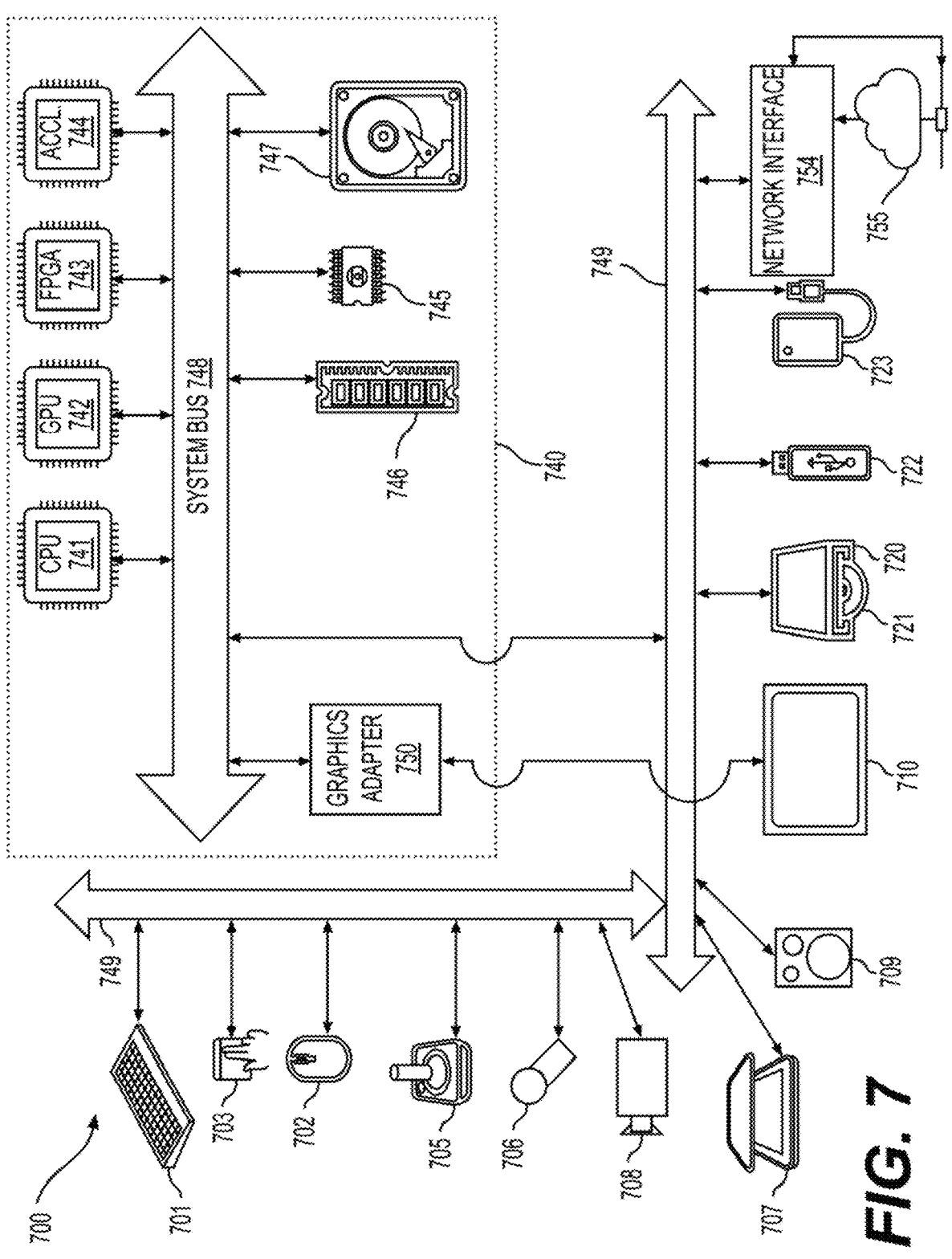
FIG. 7 is a schematic illustration of an exemplary computer system in accordance with an embodiment.

The components shown in FIG. 7 for computer system (700) are exemplary in nature and are not intended to suggest any limitation as to the scope of use or functionality of the computer software implementing embodiments of the present disclosure. Neither should the configuration of components be interpreted as having any dependency or requirement relating to any one or combination of components illustrated in the exemplary embodiment of a computer system (700).

Computer system (700) may include certain human interface input devices. Such a human interface input device may be responsive to input by one or more human users through, for example, tactile input (such as: keystrokes, swipes, data glove movements), audio input (such as: voice, clapping), visual input (such as: gestures), olfactory input (not depicted). The human interface devices can also be used to capture certain media not necessarily directly related to conscious input by a human, such as audio (such as: speech, music, ambient sound), images (such as: scanned images, photographic images obtain from a still image camera), video (such as two-dimensional video, three-dimensional video including stereoscopic video).

Input human interface devices may include one or more of (only one of each depicted): keyboard (701), mouse (702), trackpad (703), touch screen (710), data-glove (not shown), joystick (705), microphone (706), scanner (707), camera (708).

Computer system (700) may also include certain human interface output devices. Such human interface output devices may be stimulating the senses of one or more human users through, for example, tactile output, sound, light, and smell/taste. Such human interface output devices may include tactile output devices (for example tactile feedback by the touch-screen (710), data-glove (not shown), or joystick (705), but there can also be tactile feedback devices that do not serve as input devices), audio output devices (such as: speakers (709), headphones (not depicted)), visual output devices (such as screens (710) to include CRT screens, LCD screens, plasma screens, OLED screens, each with or without touch-screen input capability, each with or without tactile feedback capability—some of which may be capable to output two dimensional visual output or more than three dimensional output through means such as stereographic output; virtual-reality glasses (not depicted), holographic displays and smoke tanks (not depicted)), and printers (not depicted).

Computer system (700) can also include human accessible storage devices and their associated media such as optical media including CD/DVD ROM/RW (720) with CD/DVD or the like media (721), thumb-drive (722), removable hard drive or solid state drive (723), legacy magnetic media such as tape and floppy disc (not depicted), specialized ROM/ASIC/PLD based devices such as security dongles (not depicted), and the like.

Those skilled in the art should also understand that term "computer readable media" as used in connection with the presently disclosed subject matter does not encompass transmission media, carrier waves, or other transitory signals.

Computer system (700) can also include an interface (754) to one or more communication networks (755). Networks can for example be wireless, wireline, optical. Networks can further be local, wide-area, metropolitan, vehicular and industrial, real-time, delay-tolerant, and so on. Examples of networks include local area networks such as Ethernet, wireless LANs, cellular networks to include GSM, 3G, 4G, 5G, LTE and the like, TV wireline or wireless wide area digital networks to include cable TV, satellite TV, and terrestrial broadcast TV, vehicular and industrial to include CANBus, and so forth. Certain networks commonly require external network interface adapters that attached to certain general purpose data ports or peripheral buses (749) (such as, for example USB ports of the computer system (700)); others are commonly integrated into the core of the computer system (700) by attachment to a system bus as described below (for example Ethernet interface into a PC computer system or cellular network interface into a smartphone computer system). Using any of these networks, computer system (700) can communicate with other entities. Such communication can be uni-directional, receive only (for example, broadcast TV), uni-directional send-only (for example CANbus to certain CANbus devices), or bi-directional, for example to other computer systems using local or wide area digital networks. Certain protocols and protocol stacks can be used on each of those networks and network interfaces as described above.

Aforementioned human interface devices, human-accessible storage devices, and network interfaces can be attached to a core (740) of the computer system (700).

The core (740) can include one or more Central Processing Units (CPU) (741), Graphics Processing Units (GPU) (742), specialized programmable processing units in the form of Field Programmable Gate Areas (FPGA) (743), hardware accelerators for certain tasks (744), graphics adapters (750), and so forth. These devices, along with Read-only memory (ROM) (745), Random-access memory (746), internal mass storage such as internal non-user accessible hard drives, SSDs, and the like (747), may be connected through a system bus (748). In some computer systems, the system bus (748) can be accessible in the form of one or more physical plugs to enable extensions by additional CPUs, GPU, and the like. The peripheral devices can be attached either directly to the core's system bus (748), or through a peripheral bus (749). In an example, the screen (710) can be connected to the graphics adapter (750). Architectures for a peripheral bus include PCI, USB, and the like.

CPUs (741), GPUs (742), FPGAs (743), and accelerators (744) can execute certain instructions that, in combination, can make up the aforementioned computer code. That computer code can be stored in ROM (745) or RAM (746). Transitional data can also be stored in RAM (746), whereas permanent data can be stored for example, in the internal mass storage (747). Fast storage and retrieve to any of the memory devices can be enabled through the use of cache memory, that can be closely associated with one or more CPU (741), GPU (742), mass storage (747), ROM (745), RAM (746), and the like.

The computer readable media can have computer code thereon for performing various computer-implemented operations. The media and computer code can be those specially designed and constructed for the purposes of the present disclosure, or they can be of the kind well known and available to those having skill in the computer software arts.

As an example and not by way of limitation, the computer system having architecture (700), and specifically the core (740) can provide functionality as a result of processor(s) (including CPUs, GPUs, FPGA, accelerators, and the like) executing software embodied in one or more tangible, computer-readable media. Such computer-readable media can be media associated with user-accessible mass storage as introduced above, as well as certain storage of the core (740) that are of non-transitory nature, such as core-internal mass storage (747) or ROM (745). The software implementing various embodiments of the present disclosure can be stored in such devices and executed by core (740). A computer-readable medium can include one or more memory devices or chips, according to particular needs. The software can cause the core (740) and specifically the processors therein (including CPU, GPU, FPGA, and the like) to execute particular processes or particular parts of particular processes described herein, including defining data structures stored in RAM (746) and modifying such data structures according to the processes defined by the software. In addition or as an alternative, the computer system can provide functionality as a result of logic hardwired or otherwise embodied in a circuit (for example: accelerator (744)), which can operate in place of or together with software to execute particular processes or particular parts of particular processes described herein. Reference to software can encompass logic, and vice versa, where appropriate. Reference to a computer-readable media can encompass a circuit (such as an integrated circuit (IC)) storing software for execution, a circuit embodying logic for execution, or both, where appropriate. The present disclosure encompasses any suitable combination of hardware and software.

The use of "at least one of" or "one of" in the disclosure is intended to include any one or a combination of the recited elements. For example, references to at least one of A, B, or C; at least one of A, B, and C; at least one of A, B, and/or C; and at least one of A to C are intended to include only A, only B, only C or any combination thereof. References to one of A or B and one of A and B are intended to include A or B or (A and B). The use of "one of" does not preclude any combination of the recited elements when applicable, such as when the elements are not mutually exclusive.

While this disclosure has described several exemplary embodiments, there are alterations, permutations, and various substitute equivalents, which fall within the scope of the disclosure. It will thus be appreciated that those skilled in the art will be able to devise numerous systems and methods which, although not explicitly shown or described herein, embody the principles of the disclosure and are thus within the spirit and scope thereof.

What is claimed is:

1. A method of video decoding performed in a video decoder, the method comprising:

receiving a video bitstream including coding information of a current block, the coding information indicating that an intra block copy (IBC) mode is applied to the current block; and based on the IBC mode being applied to the current block, obtaining first adaptive block vector resolution (ABVR) information included in the coding information from the received video bitstream;

determining that the first ABVR information indicates that a plurality of BV precisions is associated with a block vector (BV) of the IBC mode;

reordering the plurality of BV precisions associated with the BV of the current block based on template matching (TM) differences between a template region of the current block and each of a plurality of template regions of reference blocks;

selecting a particular BV precision from the plurality of reordered BV precisions by the TM differences; and reconstructing the current block based at least on the selected particular BV precision.

2. The method of claim 1, wherein the reordering further comprises:

determining the TM differences between the template region of the current block and each of the template regions of the reference blocks of the current block associated with the plurality of BV precisions, the template region of the current block including samples over a top side and on a left side of the current block; and reordering the plurality of BV precisions based on the TM differences between the template region of the current block and the template regions of the reference blocks of the current block in an ascending order.

3. The method of claim 1, wherein:

the first ABVR information includes first precision index information that indicates the particular BV precision corresponding to a minimum TM difference among the TM differences between the template region of the current block and the template regions of the reference blocks of the current block, and the selecting includes selecting the particular BV precision from the plurality of reordered BV precisions that corresponds to the minimum TM difference according to the first precision index information.

4. The method of claim 1, wherein the selecting further comprises:

based on the IBC mode being applied to the current block and the first ABVR information indicating that the particular BV precision corresponds to a minimum TM difference among the TM differences, selecting the particular BV precision from the plurality of reordered BV precisions corresponding to the minimum TM difference among the TM differences between the template region of the current block and the template regions of the reference blocks of the current block.

5. The method of claim 4, wherein the selecting further comprises:

based on the IBC mode being applied to the current block and the first ABVR information indicating that the particular BV precision does not correspond to the minimum TM difference, selecting the particular BV precision from the plurality of reordered BV precisions based on first precision index information included in the coding information that indicates the particular BV precision corresponding to a second minimum difference among the TM differences between the template region of the current block and the template regions of the reference blocks of the current block.

6. The method of claim 1, wherein the reordering further comprises:

based on the first ABVR information indicating that a predetermined BV precision is excluded from the plurality of BV precisions, reordering a subset of the plurality of BV precisions that excludes the predetermined BV precision based on TM differences between the template region of the current block and template regions of a subset of the reference blocks of the current block that excludes a predetermined reference block corresponding to the predetermined BV precision in an ascending order.

7. The method of claim 6, wherein the selecting further comprises:

selecting the particular BV precision from the plurality of reordered BV precisions based on first precision index information included in the coding information that indicates the particular BV precision corresponding to a minimum TM difference among the TM differences between the template region of the current block and the template regions of the subset of the reference blocks of the current block.

8. The method of claim 1, wherein the selecting further comprises:

based on the first ABVR information indicating that the one of the plurality of BV precisions does not correspond to a minimum TM difference among the TM differences, determining whether second ABVR information of the coding information indicates that the plurality of BV precisions is ordered based on a pre-defined sequence; and based on the second ABVR information indicating that the plurality of BV precisions is ordered according to the pre-defined sequence, selecting the particular BV precision from the plurality of BV precisions in the pre-defined sequence based on second precision index information that is included in the coding information and indicates which one of the plurality of BV precisions is selected.

9. The method of claim 1, wherein the selecting further comprises:
based on the first ABVR information indicating that ABVR is enabled such that the plurality of BV precisions is ordered according to a pre-defined sequence, determining whether second ABVR information of the coding information indicates that the plurality of BV precisions is reordered based on the TM differences; and
based on the second ABVR information being determined as indicating that the plurality of BV precisions is reordered based on the TM differences, selecting the particular BV precision from the plurality of reordered BV precisions that corresponds to a minimum difference among the TM differences between the template region of the current block and the template regions of the reference blocks of the current block.

10. The method of claim 9, wherein the selecting further comprises:
based on the first ABVR information indicating that the ABVR is enabled, determining whether the second ABVR information of the coding information indicates that the plurality of BV precisions is reordered based on the TM differences; and
based on the second ABVR information being determined as indicating that the plurality of BV precisions is not reordered based on the TM differences, selecting the particular BV precision from the plurality of BV precisions in a pre-defined sequence based on second precision index information that indicates which one of the plurality of BV precisions is selected.

11. An apparatus, the apparatus comprising:
processing circuitry configured to:
receive a video bitstream including coding information of a current block, the coding information indicating that an intra block copy (IBC) mode is applied to the current block; and
based on the IBC mode being applied to the current block, obtain first adaptive block vector resolution (ABVR) information included in the coding information from the received video bitstream;
determine that the first ABVR information indicates that a plurality of BV precisions is associated with a block vector (BV) of the IBC mode;
reorder the plurality of BV precisions associated with the BV of the current block based on template matching (TM) differences between a template region of the current block and each of a plurality of template regions of reference blocks;
select a particular BV precision from the plurality of reordered BV precisions by the TM differences; and
reconstruct the current block based at least on the selected particular BV precision.

12. The apparatus of claim 11, wherein the processing circuitry is configured to:
determine the TM differences between the template region of the current block and each of the template regions of the reference blocks of the current block associated with the plurality of BV precisions, the template region of the current block including samples over a top side and on a left side of the current block; and
reorder the plurality of BV precisions based on the TM differences between the template region of the current block and the template regions of the reference blocks of the current block in an ascending order.

13. The apparatus of claim 11, wherein:
the first ABVR information includes first precision index information that indicates the particular BV precision corresponding to a minimum TM difference among the TM differences between the template region of the current block and the template regions of the reference blocks of the current block, and
the processing circuitry is configured to:
select the particular BV precision from the plurality of reordered BV precisions that corresponds to the minimum TM difference according to the first precision index information.

14. The apparatus of claim 11, wherein the processing circuitry is configured to:
based on the IBC mode being applied to the current block and the first ABVR information indicating that the particular BV precision corresponds to a minimum TM difference among the TM differences, select the particular BV precision from the plurality of reordered BV precisions corresponding to the minimum TM difference among the TM differences between the template region of the current block and the template regions of the reference blocks of the current block.

15. The apparatus of claim 14, wherein the processing circuitry is configured to:
based on the IBC mode being applied to the current block and the first ABVR information indicating that the particular BV precision does not correspond to the minimum TM difference,
select the particular BV precision from the plurality of reordered BV precisions based on first precision index information included in the coding information that indicates the particular BV precision corresponding to a second minimum difference among the TM differences between the template region of the current block and the template regions of the reference blocks of the current block.

16. The apparatus of claim 11, wherein the processing circuitry is configured to:
based on the first ABVR information indicating that a predetermined BV precision is excluded from the plurality of BV precisions,
reorder a subset of the plurality of BV precisions that excludes the predetermined BV precision based on TM differences between the template region of the current block and template regions of a subset of the reference blocks of the current block that excludes a predetermined reference block corresponding to the predetermined BV precision in an ascending order.

17. The apparatus of claim 16, wherein the processing circuitry is configured to:
select the particular BV precision from the plurality of reordered BV precisions based on first precision index information included in the coding information that indicates the particular BV precision corresponding to a minimum TM difference among the TM differences between the template region of the current block and the template regions of the subset of the reference blocks of the current block.

18. The apparatus of claim 11, wherein the processing circuitry is configured to:
based on the first ABVR information indicating that the one of the plurality of BV precisions does not correspond to a minimum TM difference among the TM differences, determine whether second ABVR information of the coding information indicates that the plurality of BV precisions is ordered based on a pre-defined sequence; and based on the second ABVR information indicating that the plurality of BV precisions is ordered according to the pre-defined sequence, select the particular BV precision from the plurality of BV precisions in the pre-defined sequence based on second precision index information that is included in the coding information and indicates which one of the plurality of BV precisions is selected.

19. The apparatus of claim 11, wherein the processing circuitry is configured to:

based on the first ABVR information indicating that ABVR is enabled such that the plurality of BV precisions is ordered according to a pre-defined sequence, determine whether second ABVR information of the coding information indicates that the plurality of BV precisions is reordered based on the TM differences; and based on the second ABVR information being determined as indicating that the plurality of BV precisions is reordered based on the TM differences, select the particular BV precision from the plurality of reordered BV precisions that corresponds to a minimum difference among the TM differences between the template region of the current block and the template regions of the reference blocks of the current block.

20. The apparatus of claim 19, wherein the processing circuitry is configured to:

based on the first ABVR information indicating that the ABVR is enabled, determine whether the second ABVR information of the coding information indicates that the plurality of BV precisions is reordered based on the TM differences; and based on the second ABVR information being determined as indicating that the plurality of BV precisions is not reordered based on the TM differences, select the particular BV precision from the plurality of BV precisions in a pre-defined sequence based on second precision index information that indicates which one of the plurality of BV precisions is selected.

* * * * *